Dec. 4, 1956  G. R. UNTHANK  2,772,781
APPARATUS FOR SEPARATING OIL AND WATER
Filed Jan. 7, 1954  3 Sheets-Sheet 3

INVENTOR
George R. Unthank
BY
Ralph B. Stewart
ATTORNEY

United States Patent Office 2,772,781
Patented Dec. 4, 1956

2,772,781

APPARATUS FOR SEPARATING OIL AND WATER

George R. Unthank, London, England, assignor of one-half to Henry Arthur John Silley, London, England Application January 7, 1954, Serial No. 402,680

Claims priority, application Great Britain January 8, 1953

6 Claims. (Cl. 210—52)

This invention relates to apparatus for separating oil and water and has for its object to provide such apparatus of improved form.

According to this invention there is provided apparatus for separating oil and water comprising a tank, a wall forming in conjunction with one or more side walls of the tank a passage which opens at the lower end into the tank at or near to the floor thereof to permit flow into the passage of liquid from the lower part of the tank, and which provides at its upper end a weir over which liquid flowing upward through the passage passes, means for introducing liquid into the upper part of the tank, discharge means from the tank for oil which separated from the liquid and which collects in the upper part of the tank, and discharge means for separated water which has passed over the said weir.

A separator which is a particular, preferred embodiment of the invention will now be described, by way of example, with reference to the accompanying drawings wherein.

Figure 1:
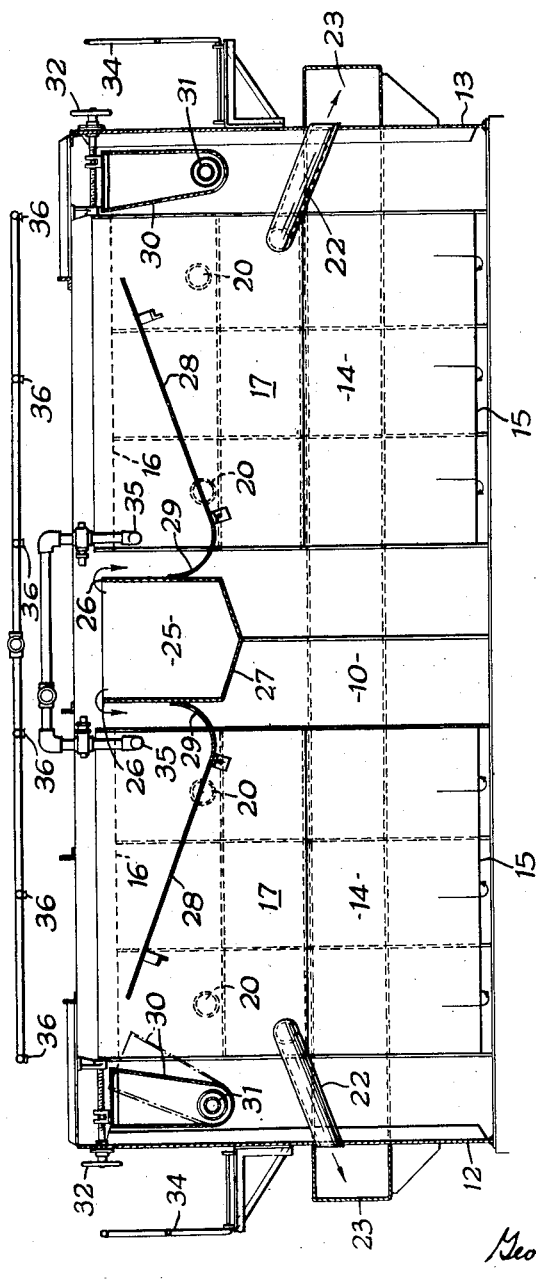
Figure 1 is a sectional view of a first separator taken on the line I—I of Figure 3.
Figure 2:
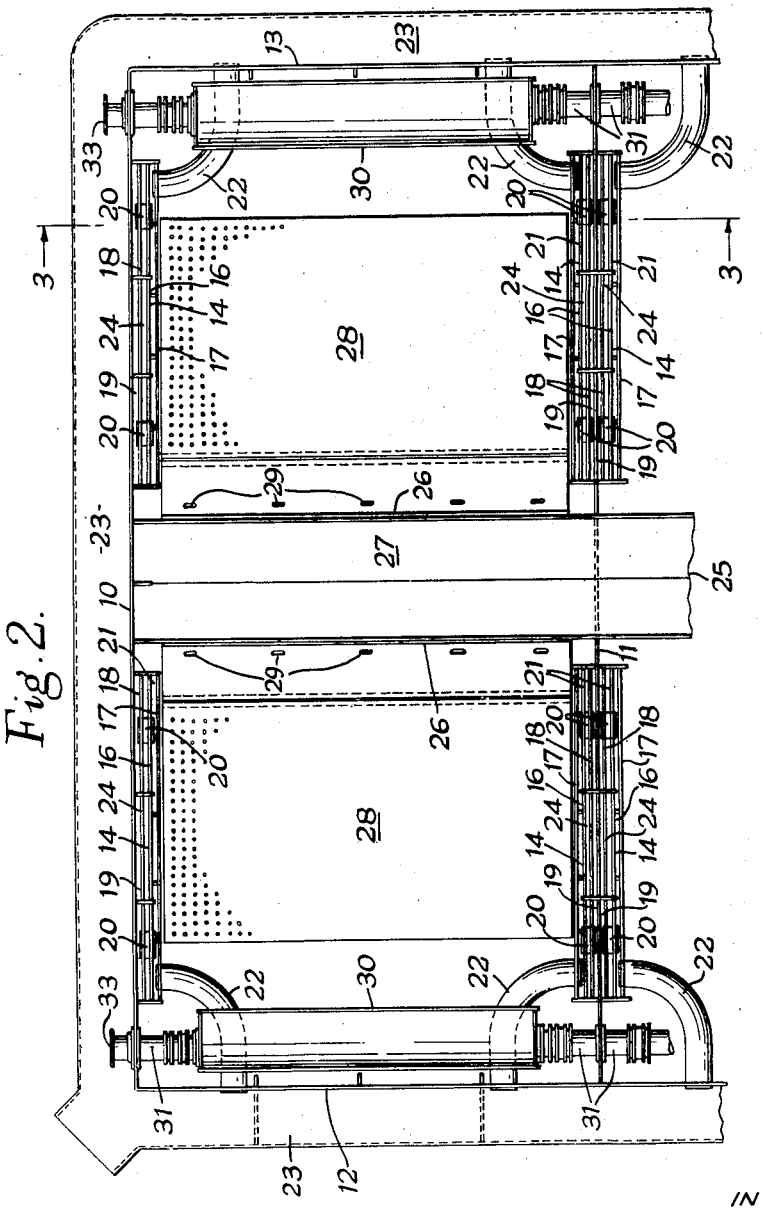
Figure 2 is a plan view of the first separator shown in Figures 1 and 3 with some parts omitted for the sake of clarity and showing also part of a second similar separator connected in parallel with the first separator.
Figure 3:
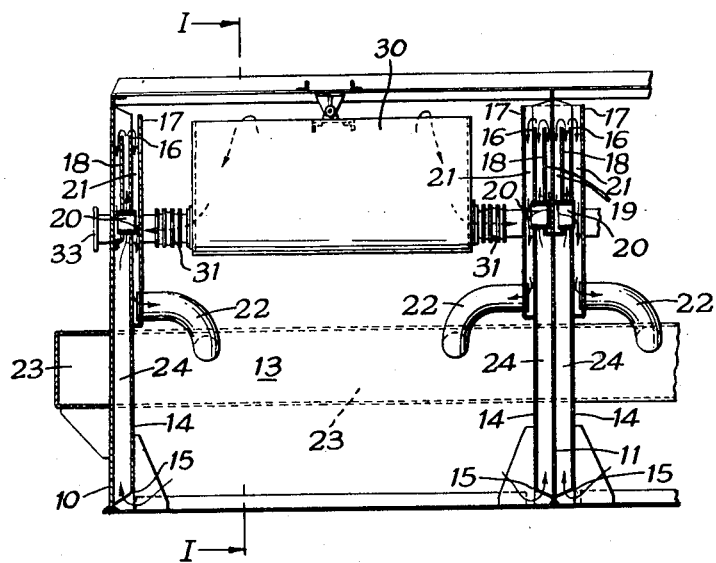
Figure 3 is a sectional view of the first separator and the said part of the second separator and taken on the line 3—3 in Figure 2.

The body of the first separator comprises a tank which is rectangular in plan and also in a section taken parallel to its two longer side walls 10 and 11. The side wall 11 also comprises one of the two longer side walls of the tank of the second separator. Extensions of the two shorter side walls 12 and 13 of the first separator comprise the shorter side walls of the tank of the second separator. Four primary partition wall sections 14 are disposed with each separator tank, each partition section being parallel with and close to a respective one of the two longer side walls. The primary partition wall sections are shorter in height than their respective longer side walls, the lower edge 15 of each partition wall section being spaced from the tank floor and its upper edge 16 being at a lower level than the upper edge of its respective side wall. A secondary partition wall section 17 of approximately half the vertical height of the respective primary partition wall section 14 is disposed within the tank parallel with and close to the respective primary section 14. The upper edge of each secondary section is higher than the respective upper edge 16 and below the level of the upper edge of the respective tank side wall, and the gap between its lower edge and the adjacent primary section 14 is closed.

A tertiary partition wall section 18 is interposed between each primary partition wall section and the respective tank longer side wall, the vertical height of each tertiary partition section being approximately half that of the respective secondary partition section. The gap between the lower edge of each tertiary partition section and the respective tank longer side wall is closed. The upper edge of each tertiary partition section is at the same level as the associated upper edge 16. The passage 19 between each tertiary partition section and its associated tank longer side wall communicates through ducts 20 with the respective passage 21 between each associated primary and secondary partition sections. Conduits 22 are provided leading from the passages 21 and through the respective shorter side walls of the tank to a water discharge trunk 23 outside the tank.

Passages 24 formed between the tank side walls and the primary partition sections open into the tank through the openings between the bottom edges 15 and the tank floor. Thus, liquid flowing downwards in the tank passes beneath the lower edges 15 and thereafter flows upwards in the said passages 24. Since the upper edges of the primary and tertiary partition sections are at a lower level than the adjacent upper edges of the respective tank longer side walls and secondary partition sections, they constitute weirs over which separated water flowing upwards in the passages 24 passes. The separated water flowing over the weirs passes into the said passages 19 and 21 and then through the said conduits 22 into the water discharge trunk 23.

The mixture of oil and water to be separated is introduced into the upper part of the tank by means comprising a channel-section conduit 25, which passes through appropriately shaped apertures in the two longer side walls of the tanks. The side-walls 26 of the conduit form weirs over which the liquid in the conduit flows into the tank, these last-mentioned weirs being at a higher level than the weirs provided by the primary and tertiary partition sections in order to create a pressure head of liquid for moving the liquid through the separator. The floor 27 of the conduit sags towards the bottom of the tank (e. g. transversely it is of V- or U-section) in order to prevent oil which rises in the tank from being trapped beneath it. Two baffles 28 are provided, each extending from a respective side wall 26 of the conduit.

The portions of the baffles nearer to the conduit 25 extend outwardly and downwardly and are unperforated except for slots 29 which permit oil trapped between the baffles 28 and the side walls 26 to escape to the upper part of the tank. The portion of each baffle further from the conduit 25, being the larger part of the baffle, is perforated with a large number of closely spaced holes. Thus, the liquid flowing over the weirs provided by the conduit side walls 26 is directed upwards and outwards towards the shorter side walls. When the liquid reaches the perforated portions of the baffles the heavier water passes through the perforations (together with some oil) leaving behind the greater part of the separated oil.

The outwardly flowing oil passes over weirs provided by two open-top oil-collecting boxes 30 each disposed adjacent one of the two shorter tank side-walls. The boxes are approximately rectangular in plan and of approximately U-section. Each box is pivoted on two short sections of pipe 31 fixed to and passing through the longer side walls and the level of the weir provided thereby is adjusted by rotating the box on its pivot, a suitable mechanical connection to an operator's hand-wheel 32 being provided for this purpose. The extent of the adjustment available of the level of the weir is indicated by the outlines in solid and dotted lines at the left hand side of Figure 1 the two outlines indicating the extreme limit positions. The said sections of pipe 31 also serve as oil discharge conduits from the boxes, an oil discharge pipe or pipes (not shown) outside the tank being connected to oil discharge ports 33. Cat-walks 34 (Figure 1) are provided to enable an operator to gain access to the hand-wheels 32.

Movement of separated oil in the upper part of the tank towards the oil-collecting boxes 30 is assisted by means of two perforated water supply pipes 35 (Figure 1), each disposed adjacent to and just below the level of the outermost edge of the respective baffle 28. The size and disposition of the perforations in the two pipes, and the pressure at which water is supplied to them, are so arranged that the resulting jets of water impinge gently against the lower surface of the "oil blanket" in the upper part of the tank and give it a gentle motion towards the boxes. The levels of the box weirs are too high for water from the jets to flow over these weirs.

In order that the separator shall give the required degree of separation it is necessary to ensure that it provides a large volume in which non-turbulent downward flow of the liquid mixture (during which the oil and water can separate) takes place. This volume must therefore be as free as possible from obstructions such as the weirs, etc., which are necessary for the removal of the separated oil and water, since obstructions will cause turbulence in the downward flow. Separators in accordance with the present invention provide such an obstruction-free volume.

Nozzles 36 (Figure 1) mounted above the tank are supplied with water and produce a very fine mist or spray above the surface of the oil blanket in the separator, the mist or spray assisting in preventing the escape of the evil-smelling gases and other volatile products often given off by the separated oil.

The other longer side wall of the second separator can form one of the longer side walls of a third separator, and so on, the separators being connected in series or parallel.

An arrangement such as that illustrated in which at least two separators are connected in parallel and have the water and oil discharge trunks, and one longer side wall, in common is suitable for use in an installation as disclosed in co-pending patent application Serial No. 295,095, filed June 23, 1952.

In the embodiment described above each longer wall of the tank is associated with two separate primary, secondary and tertiary partition wall sections, but it will be apparent that each two separate partition wall sections can be replaced by a single partition wall extending over at least the major part of the length of the associated tank wall, the partition walls being apertured to permit the conduit 25 to pass therethrough. In another embodiment each associated pair of primary and secondary partition walls may form the passages 21 and 24 in conjunction with two or more of the tank side walls. Thus, for example, the separator may comprise only one primary partition wall and one secondary partition wall, the partition walls cooperating with all the walls of the tank.

I claim:

1. Apparatus for separating oil and water comprising a tank, an open-topped, channel-section conduit for discharging liquid into the tank and disposed in the upper part of the tank, at least one of the conduit side walls providing a weir over which liquid entering the tank from the conduit must flow, discharge means for oil which separates from the liquid in the tank and which collects in the upper part of the tank between said open-topped conduit and said discharge means, a primary partition wall disposed closely adjacent at least one tank side wall and providing a first passage which is open at its lower end into the tank adjacent the tank floor to permit flow into the first passage of water from the lower part of the tank, the primary partition wall providing at its upper end a first weir over which water flowing upward in the first passage passes, discharge means for water which has passed over the said first weir, and at least one baffle extending from the side wall of the open-topped conduit toward said oil discharge means, the smaller part of said baffle nearer to the open-topped conduit being shaped to direct the downward flow of liquid passing over the conduit side wall in an outward direction toward said oil discharge means, and the greater part of said baffle further from the open topped conduit being perforated to allow the water to separate from the oil and sink to the bottom of the tank and flow into said first passage.

2. Apparatus as claimed in claim 1, wherein the bottom of the said channel section conduit is convex toward the bottom of the tank and the smaller part of said baffle has an aperture formed therein to permit oil which collects beneath said baffle to pass to the upper side of said baffle.

3. Apparatus as claimed in claim 1, and including water nozzles disposed in the tank below the lowest level of said oil discharge means and directed to provide jets of water which impinge on the underside of the blanket of separated oil between the said oil discharge means and said open-topped conduit and which impart to at least part of the blanket movement in the direction toward the said oil discharge means.

4. Apparatus as claimed in claim 1, wherein said water discharge means comprises a secondary partition wall disposed adjacent the primary partition wall on the side thereof further from the tank side wall, the primary and secondary partition walls forming between themselves a second passage into which flows separated water that has passed over the said first weir, and a water discharge conduit leading from the said second passage to the tank exterior.

5. Apparatus as claimed in claim 4, and including a tertiary partition wall interposed between the primary partition wall and the tank wall, the tertiary partition wall providing at its upper end a second weir at substantially the same level as the first first weir and over which liquid flowing upward in the first passage passes, the tertiary partition wall and the tank wall forming between themselves a third passage into which flows separated water that has passed over the said second weir, and at least one conduit connecting each associated second and third passages.

6. Apparatus for separating oil and water comprising two tanks having a wall in common, an open-topped, channel-section conduit common to both tanks for discharging liquid into the tanks and disposed in the upper part of the tanks, at least one of the conduit side walls providing weirs over which liquid entering the tanks from the conduit must flow, discharge means from each tank for oil which separates from the liquid in the tanks and which collects in the upper part of the tanks between said open-topped conduit and said discharge means, a primary partition wall in each tank disposed closely adjacent at least one tank side wall of the respective tank and providing a passage which is open at its lower end into the respective tank adjacent the tank floor to permit flow into the passage of water from the lower part of the tank, each primary partition wall providing at its upper end a weir over which water flowing upward in the passage passes, a common water discharge trunk externally of the tanks, discharge means from each tank to the said common trunk for separated water which has passed over the respective weir, and baffles extending from the side wall of the open-topped conduit in each tank toward said oil discharge means, the smaller part of said baffles nearer to the open-topped conduit being shaped to direct the downward flow of liquid passing over the conduit side wall in an outward direction toward said oil discharge means, and the greater part of said baffles further from the open-topped conduit being perforated to allow the water to separate from the oil and sink to the bottom of the tank and flow into said first passage.

(References on following page)

References Cited in the file of this patent

UNITED STATES PATENTS

| | | |
|---|---|---|
| 757,448 | Friesdorf | Apr. 19, 1904 |
| 1,636,815 | Green et al. | July 26, 1927 |
| 1,864,511 | Jones | June 21, 1932 |
| 2,078,260 | Mallory | Apr. 27, 1937 |
| 2,140,581 | Hirshstein | Dec. 20, 1938 |

FOREIGN PATENTS

| | | |
|---|---|---|
| 41,413 | Austria | Mar. 25, 1910 |
| 443,601 | Great Britain | Mar. 3, 1936 |
| 699,510 | Germany | Nov. 30, 1940 |